United States Patent Office 3,434,978
Patented Mar. 25, 1969

3,434,978
SHIELDING COMPOSITION OF CEMENTITIOUS MATERIAL MIXED WITH A METALLIC SATURATED FATTY ACID COMPOUND
Reinhard Ernst Vogel, Munich-Harlaching, Germany, assignor of one-half to Friedrich Marxen, Vaduz, Liechtenstein
No Drawing. Filed Nov. 25, 1966, Ser. No. 596,764
Int. Cl. G21f 1/04; C04b 7/02, 7/34
U.S. Cl. 252—478        18 Claims

ABSTRACT OF THE DISCLOSURE

A building material having a shielding effect against radioactive radiation and including as essential constituents thereof: (a) a cementitious material having distributed therethrough and intimately mixed therewith an effective amount of (b) at least one compound formed substantially of a saturated fatty acid being solid at room temperature and having at least nine carbon atoms and of at least one metal having a shielding effect against radioactive radiation.

---

The present invention relates to a building material having a shielding effect against radiation, and to a method of making the same. More particularly, the present invention is concerned with a cementitious building material, i.e., a building material consisting of or containing, for instance, cement, such as portland or blast furnace cement, magnesia cement such as sorel cement, hydraulic or nonhydraulic lime, gypsum or the like, as well as mixtures of such cementitious materials with aggregate, for instance concrete or plaster. The present invention is concerned with a flowable mass of cementitious material with or without aggregate, as well as with solid building materials, such as shaped solid bodies formed by solidification of concrete or the like, which building materials have incorporated therein and finely distributed therethrough substances which will endow the material with a radiation shielding effect.

In one of its applications, the present invention is concerned with the protection of buildings or other structures against radiation, particularly gamma and neutron radiation.

The shielding against, scattering and deceleration of such radiation is achieved by incorporating in the building material additives which are capable of scattering or decelerating the radiation or of shielding against the same, whereby it is essential that these additives will not cause a significant reduction in the strength of the building material or the building element formed thereof, for instance a concrete block. Conventional additives for the above purpose are primarily barium oxide in the form of baryte, magnetite, hematite, as well as lead and lead compounds.

The conventional distribution of finely subdivided lead, preferably in colloidal condition, into concrete will give the desired protection against alpha, beta and gamma rays, however, it is not satisfactory with respect to protection against neutron rays which do not carry an electric charge.

It has also been proposed to shield against radiation by incorporation of heavy additives such as synthetic lead or iron compounds and, in addition, to incorporate light additives in the form of hydrogen-containing compounds or, for instance water in the form of water of crystallation, hydrogen-containing chemical compounds such as hydroxides or organic compounds such as paraffin. If the radiation shielding additive is to be incorporated in a hydraulic binder material such as concrete, it is important to have the same evenly dstributed therethrough and also to choose an additive which is compatible with the concrete so as to maintain the desired strength thereof. The same holds true for non-hydraulic binder materials. Paraffin is not compatible with mortar and with exterior and interior plasters, cement, asbestos and gypsum materials. In connection with all of these building materials, the incorporation of such additive would detrimentally impair the strength of the solid body formed thereof.

It has also been proposed to mix lead powder with lead sulfate and a small proportion of an epoxy resin, such as 7%, and to form thereof a shielding body. It has also been suggested to proceed in this manner however with only 5% epoxy resin. According to another suggestion, plates consisting essentially of paraffin are used as protection against radiation.

The incorporation into a building material of additives which decelerate neutrons, such as carbon in the form of graphite or amorphous coal or hard coal, or beryllium or chemical compounds of beryllium, in addition to neutron absorbing elements such as boron, cadmium or lithium, or chemical compounds thereof has also been proposed.

It is however of particular importance to introduce such additives into the building material which, on the one hand, will decelerate not only alpha, beta and gamma rays but also the neutron rays which are capable of penetrating nearly all materials and which, on the other hand, are compatible with the various types of building materials such as concrete, magnesium cement, interior and exterior plaster, asbestos cement, gypsum plates and the like.

It is therefore an object of the present invention to provide a building material and a method of making the same, which building material will provide effective protection, not only against alpha, beta and gamma rays, but also against neutron radiation and which, when in the form of concrete or the like, will possess substantially the same strength characteristics as it would possess in the absence of the radiation protective additive.

Other objects and advantages of the present invention will become apparent from a further reading of the description and of the appended claims.

With the above and other objects in view, the present invention contemplates a building material having a shielding effect against radioactive radiation and including as essential constituents thereof a cementitious material having distributed therethrough and intimately mixed therewith an effective amount of at least one compound of a metal selected from the group consisting of lead, bismuth, tungsten, zirconium, iron, tin, cadmium, lithium and barium, with a saturated fatty acid being solid at room temperature and having at least 9 carbon atoms.

The building material of the present invention may be in flowable condition, i.e., such as a concrete mass prior to pouring of the same, or it may be in the form of a shape-retaining solid body, such as a concrete body or the like after the same has been cast or otherwise solidified.

The compound of one of the above-described metals with the saturated fatty acid will be preferably formed with a saturated fatty acid which includes at least 16 carbon atoms, and compounds of palmitic acid and particularly stearic and montanic acid have given very good results.

Preferably, the protective compound will be incorporated in the building material in an amount equal to between about 2.5 and 35% of the weight thereof.

The present invention also includes the method of producing such building material as will be described in more detail further below.

Thus, the present invention proposes a building material which has a shielding effect against radioactive rays, particularly gamma and neutron radiation, which contains a radiation protective additive which, even if present in relatively large proportions, will be compatible with the building material per se and will not significantly reduce the strength characteristics thereof. Thus, the building material according to the present invention may include a significant proportion, generally between 2.5 and 35% of compounds of a saturated fatty acid containing at least 9 carbon atoms but preferably containing 16 or more carbon atoms, such as stearic acid or a montanic acid, with at least one of the metals lead, bismuth, tungsten, zirconium, iron, tin, cadmium, lithium or barium. The cementitious component of the building material may be, for instance, concrete, magnesium cement, exterior or interior plaster compositions, asbestos cement or gypsum plates.

The presence of the above-mentioned metals has a decelerating effect with respect to alpha, beta and gamma rays, whereas the saturated fatty acids having at least 9 carbon atoms and preferably more, have a shielding effect with respect to neutrons. The decelerating effect for gamma rays depends on the number of the respective protective element in the periodic system and its density. The elements cadmium, zirconium and lithium adsorb and scatter neutron rays so that the fatty acid compounds of the three last-mentioned elements have a particularly good effect with respect to shielding against neutron radiation. Montanic acids are higher fatty acids with 25 or 33 carbon atoms, mainly with 27, 29 and 31 carbon atoms, respectively, which, as well as stearic acid, are easily available on a commercial scale and very suitable for the purposes of the present invention. The stearates or montanates may be, for instance, neutral as well as basic compounds, for instance lead stearates. Thus, for instance, the interior and exterior plaster of a basement may include up to 35% lead stearate and such plaster in a thickness of between 2 and 5 centimeter or even thicker will give effective radiation protection.

The saturated fatty acid compounds which are utilized in accordance with the present invention should be solid at room temperature. The greater the number of carbon atoms in the saturated fatty acid the better is the protection against neutron radiation given by the same, due to the greater number of hydrogen atoms present.

Within the broad range of from about 2.5 to 35% of radiation protective additive, in most cases a more limited range of between about 9 and 20% is preferred. The degree of protection increases of course with an increased proportion of the protective additive. Thus, in order to obtain the desired protective effect when employing relatively thin building elements, it is generally desirable to incorporate the largest possible proportion of the protective additive which is compatible with the cementitious material and will not significantly reduce the strength characteristics of the building element. Preferably in the case of lead montanates, the proportion to be incorporated in a concrete formed essentially of cement and sand will be up to between 20 and 23%, in the case of lead stearates a large proportion may be incorporated since the latter is not as voluminous as the lead montanates.

To go below a proportion of 2.5% of the protective additive, generally will not give the desired degree of protection and, on the other hand, to increase the proportion to more than 35% will not be possible in most cases without impairing the quality of the building element. Furthermore, an unnecessary increase in the proportion of the additive would also unnecessarily increase the costs of the building element.

The additives of the present invention can be easily incorporated in mortar masses and, if desired, for instance in the case of concrete, so as to obtain a product of high density. Incorporation of the additive may be carried out directly by first forming an aqueous dispersion of the same with the help of emulsifiers, preferably ammonium compounds of saturated fatty acids such as ammonium stearate. The ammonia of such emulsifiers will escape after some time and the acid residue which remains is capable of absorbing neutrons.

However, it is also within the scope of the present invention to produce the building materials by incorporating the metal compound in hydraulic or nonhydraulic binders and lime binders in such a manner that the metal compound is finely distributed in a solution of acid casein or in synthetic resins such as unsaturated polymerizable polyesters, epoxy resins or vinyl resins, preferably vinyl acetate and/or propionate, whereby the latter two resins are particularly suitable when present in the form of an emulsion.

The incorporation of the above-described protective additive into concrete, magnesia cement, exterior and interior plaster, asbestos cement or gypsum (for forming gypsum plates) gives particularly good results.

By suitable further additions of barium oxide, boron carbide, boric acid, boron trioxide, or iron waste such as iron turnings, lead sulfide or lead oxides, preferably in pulverulent or colloidal form, the protective effect may be further increased.

Such further additions preferably are made in an amount of between 5 and 20% of the weight of the building element.

The ammonium stearates as emulsifiers may be replaced by other ammonium compounds of saturated fatty acids having at least 9 carbon atoms, and the ammonium thereof may also be replaced by sodium or potassium. Thus, for instance, sodium palmitate may be used as an emulsifier for forming an aqueous emulsion of the metal compound.

The following examples are given as illustrative only without, however, limiting the invention to the specific details of the examples.

EXAMPLE I

In a rotary cement mixer, an intimate mixture is formed of the following materials:

| | Kg. |
|---|---|
| Moist sand, 5–8 mm. | 6.6 |
| Moist sand, 3–5 mm. | 13.2 |
| Moist sand, 0–3 mm. | 6.4 |
| Hard quartz sand, 0–2 mm. | 5.4 |
| Hard fine sand, 0–2 mm. | 1.2 |
| Finely ground baryte | 2.0 |
| Finely ground galena | 1.0 |
| Blast furnace cement | 7.0 |
| Water | 3.6 |

To the thus-formed mixture, 5.7 kg. lead stearate are then slowly added and, after a homogeneous mixture has been formed, the same is introduced into iron molds or frames and the latter placed for about 10 minutes on a vibrating table. Thereafter, the mixture is pressed in a concrete plate press for a period of between about 2 and 5 minutes at a pressure of between 10 and 100 kg./cm.$^2$.

EXAMPLE II

In the manner described above, a mixture is formed of:

| | Kg. |
|---|---|
| Sand, 5–8 mm. | 5.96 |
| Sand, 3–5 mm. | 11.88 |
| Sand, 0–3 mm. | 5.78 |

Separately, 125 grams ammonium stearate are stirred into 4 liters of water (as emulsifier) and thereafter 3.23 kg. of lead-montanic acid compounds are stirred into the thus formed mixture. A stiff paste is formed in this manner.

The two mixtures formed as described above are combined and further mixed in a concrete mixer. During this further mixing, the following is added:

| | Kg. |
|---|---|
| Hard quartz sand, 0–2 mm. | 3.8 |
| Finely ground baryte | 2.7 |
| Colloidal lead | 1.0 |
| Portland cement | 6.5 |

The thus completed mixture is then further worked up as described in Example 1.

The hard fine sand and the quartz sand are interchangeable and it is also possible to use only one or the other of these two types of sand, preferably in the combined amounts thereof described hereinabove.

EXAMPLE III

| | Kg. |
|---|---|
| Acid caseine | 2 |
| Calcium hydroxide | 0.6 |
| Sodium fluoride | 0.32 | are mixed and stirred with water to form a thick paste which is then permitted to stand for between 40 and 50 minutes. Thereafter, the paste is diluted with water to form a mixture containing 60% water. Thereafter, 2.5 kg. of calcium stearate are admixed.

| | Kg. |
|---|---|
| Sand, 5–8 mm. | 4.5 |
| Sand, 3–5 mm. | 10.0 |
| Sand, 0–3 mm. | 4.0 |
| Powdered hematite | 0.5 |
| Iron shavings | 1 |
| Portland cement | 4.2 | are mixed with water to form a stiff paste and the above described cadmium stearate-containing mixture is worked into the same.

The thus formed completed mixture is worked up further as described in Example I.

The term "acid caseine" is meant to denote caseine which has been precipitated with acid.

EXAMPLE IV

| | Kg. |
|---|---|
| 40% vinyl acetate emulsion | 4.0 |
| Lead stearate | 3.5 | are stirred together to form a pasty slurry.

| | Kg. |
|---|---|
| Portland cement | 2.0 |
| Lime | 2.0 |
| Baryte | 1.0 |
| Sand, 0–5 mm. | 3.0 | are stirred with water to form a stiff paste, and the above-described lead stearate-containing mixture is incorporated in the thus formed paste.

The thus produced final mixture is used as a lime cement plaster which preferably is applied as a relatively thick layer.

EXAMPLE V 100 g. ammonium palmitate are dissolved in 4 kg. water, and 3.0 kg. of lead hexacosanic acid are stirred into the thus formed solution. Thereby an emulsion is formed into which are stirred, in the indicated sequence, 0.5 kg. baryte and 4.5 kg. of common grade plaster of Paris.

The thus formed mixture may be used to form a layer of plaster, or may be cast into plates.

EXAMPLE VI

| | Kg. |
|---|---|
| Magnesium oxide | 10 |
| Magnesium chloride (anhydrous) | 5 |
| Magnetite (fine powder) | 1 |
| Yellow iron oxide (fine powder) | 0.3 | are mixed with each other and stirred with water to form a paste.

| | Kg. |
|---|---|
| Lead stearate | 4 |
| Sawdust or cork flour | 2.5 | are stirred into the thus formed mixture. The thus completed mixture is cast into plates and pressed for 10 minutes at a pressure of between 2 and 20 kg./cm.$^2$. Thereafter, the pressed plates are allowed to stand for 24 hours and are then ready for use.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A building material having a shielding effect against radioactive radiation and including as essential constituents thereof (a) a cementitious material having distributed therethrough and intimately mixed therewith an effective amount of (b) at least one compound of a saturated fatty acid being solid at room temperature and having at least 9 carbon atoms with at least one metal selected from the group consisting of lead, bismuth, tungsten, zirconium, iron, tin, cadmium, lithium and barium.

2. A flowable mass suitable for use as a building material capable of being solidified to form a shape retaining solid body and having the composition defined in claim 1.

3. A shape retaining solid body suitable for use as a building material and having the composition defined in claim 1.

4. A building material as defined in claim 1, wherein said saturated fatty acid has at least 16 carbon atoms.

5. A building material as defined in claim 1, wherein said fatty acid is palmitic acid.

6. A building material as defined in claim 1, wherein said fatty acid is stearic acid.

7. A building material as defined in claim 1, wherein said fatty acid is a montanic acid.

8. A building material as defined in claim 1, wherein said compound is selected from the group consisting of lead compounds of stearic and montanic acids.

9. A building material as defined in claim 1, wherein said cementitious material is selected from the group consisting of portland, blast furnace and magnesia cements, gypsum, and hydraulic and nonhydraulic lime, and wherein said building material additionally includes aggregate.

10. A building material as defined in claim 1, wherein said metal compound of a saturated fatty acid is incorporated into said cementitious material in the form of a solution of said metal compound in a substance selected from the group consisting of casein, epoxy resins, unsaturated polymerizable polyesters and vinyl resins.

11. A building material as defined in claim 10, wherein said vinyl resin is selected from the group consisting of vinyl acetate and vinyl propionate.

12. A building material as defined in claim 1, wherein said effective amount is equal to between about 2.5 and 35% of the weight of said building material.

13. A building material as defined in claim 12, wherein said building material consists of concrete having distributed therethrough said metal compound of said saturated fatty acid.

14. A building material as defined in claim 1, and additionally including an effective amount of at least one substance selected from the group consisting of barium oxide, boron carbide, boric acid, boron trioxide, iron, lead sulfide, lead and lead oxide.

15. A building material as defined in claim 1, wherein said compound of said fatty acid is in the form of an aqueous emulsion thereof.

16. A building material as defined in claim 15, wherein said emulsion contains an ammonium compound of a saturated fatty acid as emulsifier.

17. A building material as defined in claim 16, wherein siad ammonium compound is ammonium stearate.

18. A building material having a shielding effect against radioactive radiation and including as essential constituents thereof (a) a cementitious material having distributed therethrough and intimately mixed therewith an effective amount of (b) at least one compound formed substantially of a saturated fatty acid being solid at room temperature and having at least nine carbon atoms and of at least one metal having a shielding effect against radioactive radiation.

References Cited

UNITED STATES PATENTS

| | | | |
|---|---|---|---|
| 2,403,794 | 7/1946 | Goldrick et al. | |
| 2,441,945 | 5/1948 | Frolich et al. | |
| 2,726,339 | 12/1955 | Borst | 252—478 X |
| 3,002,843 | 10/1961 | Stöcker | 252—478 |
| 3,006,777 | 10/1961 | Atkin | 252—478 X |
| 3,122,513 | 2/1964 | Dempsey | 252—478 |
| 3,207,705 | 9/1965 | Hall | 252—478 |
| 3,238,148 | 3/1966 | Osborne | 252—478 |
| 3,239,472 | 3/1966 | De Lisle | 252—478 |

CARL D. QUARFORTH, *Primary Examiner.*

S. J. LECHERT, *Assistant Examiner*

U.S. Cl. X.R.

106—90, 97